Patented Mar. 21, 1939

2,151,635

UNITED STATES PATENT OFFICE 2,151,635

COMPOUNDS OF THE ANTHRAQUINONE SERIES

William Dettwyler, Milwaukee, Wis., assignor to E. I. du Pont de Nemours & Company, Wilmington, Del., a corporation of Delaware No Drawing. Application May 21, 1937, Serial No. 143,925

1 Claim. (Cl. 260—367)

This invention relates to the preparation of new compounds of the anthraquinone series, and more particularly to the preparation of new beta,-beta'-dichloro-1,1'-dianthrimides wherein the chlorine is present in the 6,6', 6,7' or 7,7' positions of the two anthraquinone groups. The invention also contemplates the preparation of the aluminum chloride condensation products of ring-closed anthrimides, which like the anthrimides themselves are valuable intermediates for the manufacture of new dyestuffs. The presence of chlorine in the beta,beta' positions of the benzene rings remote from the anthrimide linkage makes possible the preparation of new dyestuffs which exhibit improved fastness properties over the corresponding compounds which contain no halogen in the molecule or halogen only in the alpha positions. These new beta,beta'-halogen-1,1'-dianthrimides also permit the preparation of new polyanthrimides, which are in themselves valuable dyestuffs, without further ring-closure of the resulting anthrimide.

It is therefore an object of the present invention to provide new and valuable dyestuff intermediates which are capable of being used in a variety of combinations to give new and valuable dyestuffs; and to provide a process for preparing such new dyestuff intermediates. According to this invention, one mole of 1-amino-6-chloroanthraquinone is condensed with one mole of 1,6-dichloroanthraquinone by the process usually employed in the preparation of anthrimide compounds; with subsequent ring-closure of the 6,6'-dichloro-1,1'-dianthrimide with aluminum chloride if desired. The isomeric 7,7'-dichloro- and 6,7'-dichlorodianthrimides, and aluminum chloride condensation products of the same, may be obtained in the same manner by starting with 1,7-dichloroanthraquinone and 1-amino-7-chloroanthraquinone, or with a mixture of the 1,6 and 1,7 isomers. The aluminum chloride ring-closure may be effected either as a dry fusion in the presence of sodium chloride or it may be carried out in pyridine.

The following examples are given to illustrate the invention more fully. The parts used are by weight.

Example 1

28 parts 1,6-dichloroanthraquinone, 26 parts 1-amino-6-chloroanthraquinone, 15 parts soda ash, and 1 part cuprous chloride are heated in 500 parts nitrobenzene at reflux temperature for 8 hours. When no more increase in crystals is noticed, the mass is cooled to room temperature and filtered. The cake is washed with nitrobenzene, alcohol, and water. The so-obtained 6,6'-dichloro-1,1'-dianthrimide is a red crystalline product, soluble in concentrated sulfuric acid with an olive color and has poor affinity for cotton from an alkaline hydrosulfite vat.

The isomeric 7,7'-dichlorodianthrimide may be obtained by the same process if 1,7-dichloroanthraquinone is condensed with 1-amino-7-chloroanthraquinone. The 6,7'-dichloro-1,1'-dianthrimide may likewise be prepared if 1,6-dichloro- or 1-amino-6-chloroanthraquinone is condensed with 1-amino-7-chloroanthraquinone or 1,7-dichloroanthraquinone, respectively.

Example 2

300 parts of aluminum chloride and 30 parts sodium chloride are melted and at 150° C. 30 parts of the 6,6'-dichlorodianthrimide as prepared in Example 1 are slowly added. The temperature is then raised to 160-165° C. and held for 1 hour. The liquid mass is then poured into 3000 parts of cold water and the precipitate filtered and washed free from salts. On drying down a dark powder is obtained which dissolves in concentrated sulfuric acid with a Bordeaux color. The so-obtained crude color can be purified by any of the known methods, as for example, oxidation with dichromate in boiling 10% sulfuric acid. It dyes cotton in brown shades from a brown vat.

In like manner the 7,7'-dichloro- and 6,7'-dichloroanthrimides may be converted to the ring-closed products which dye in similar shades to the 6,6'-dichlorodianthrimide.

The preparation of the alpha,alpha'-dianthrimides carrying chlorine in the 6,6', 7,7' or 6,7' position makes possible the preparation of a large number of dyestuffs never before contemplated, many of which exhibit desirable dyeing properties. The reactivity of the beta-halogen permits further condensation, while the presence of halogen in the beta position makes possible further nitration of the dianthrimides or the introduction of other substituents in the alpha position, resulting in compounds which because of the presence of halogen, particularly in the 6,6' positions, have improved light fastness.

I claim:

6,6'-dichloro-1,1'-dianthrimide.

WILLIAM DETTWYLER.